United States Patent
Chu et al.

(10) Patent No.: US 6,337,435 B1
(45) Date of Patent: Jan. 8, 2002

(54) TEMPERATURE CONTROL FOR MULTI-VESSEL REACTION APPARATUS

(75) Inventors: Daniel Y. M. Chu, San Francisco; Donald L. Rising, Berkeley; Jeff Ceremony, Fairfield; Cliff Baldwin, Brentwood, all of CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 09/612,863

(22) Filed: Jul. 10, 2000

Related U.S. Application Data
(60) Provisional application No. 60/146,712, filed on Jul. 30, 1999, and provisional application No. 60/170,128, filed on Dec. 10, 1999.

(51) Int. Cl.[7] ............................................... H01L 35/02
(52) U.S. Cl. ......................... 136/242; 136/203; 422/99
(58) Field of Search ............................. 136/203, 204, 136/242; 422/99, 104; 435/285.1, 303.1

(56) References Cited

U.S. PATENT DOCUMENTS 5,508,197 A    4/1996   Hansen et al. ........... 435/285.1
5,779,981 A    7/1998   Danssaert et al. ............ 422/99
5,945,073 A    8/1999   Ditzler et al. .......... 422/186.19

FOREIGN PATENT DOCUMENTS

| | | |
|---|---|---|
| EP | 0 438 883 A2 | 7/1991 |
| EP | 0 488 769 A2 | 6/1992 |
| EP | 0 662 345 A1 | 7/1995 |
| WO | WO 89/12502 | 12/1989 |

*Primary Examiner*—Kathryn Gorgos
*Assistant Examiner*—Thomas H Parsons
(74) *Attorney, Agent, or Firm*—Townsend and Townsend and Crew

(57) ABSTRACT

Temperature control in a rectangular array of reaction vessels such as a thermal cycler such as is used for PCR procedures is achieved by use of a temperature block that is in contact with a combination of Peltier effect thermoelectric modules and wire heating elements embedded along the edges of the block. The elements can be energized in such a manner as to achieve a constant temperature throughout the array or a temperature gradient. Further control over the temperature and prevention of condensation in the individual reaction vessels is achieved by the use of a glass (or other transparent material) plate positioned above the vessels, with an electrically conductive coating on the upper surface of the glass plate to provide resistance heating.

10 Claims, 6 Drawing Sheets

TEMPERATURE CONTROL FOR MULTI-VESSEL REACTION APPARATUS

CROSS-REFERENCE TO RELATED APPLICATIONS

This application is related to U.S. Provisional Patent Applications Nos. 60/146,712, filed Jul. 30, 1999, and 60/170,128, filed Dec. 10, 1999, and claims all benefits legally available from both. Each of these provisional patent applications is incorporated herein by reference for all purposes capable of being served thereby.

BACKGROUND OF THE INVENTION

1. Field of the Invention

This invention resides in the design and use of temperature control blocks for use in multi-well reaction plates, such as those used in PCR procedures.

2. Description of the Prior Art

Certain chemical syntheses involve the use of sequential reactions, cyclic reactions, or multiple reactions occurring simultaneously. Prominent examples of such syntheses are the polymerase chain reaction and the ligase chain reaction. The polymerase chain reaction (PCR), for example, entails a sequence of steps including denaturing a polynucleotide, annealing primer oligonucleotides to the denatured polynucleotide, and extension of the primers to synthesize new polynucleotide strands along the denatured strands. The success of the procedure relies on high yield, high selectivity, and a controlled reaction rate at each stage. Yield, selectivity, and reaction rate often vary with temperature, and optimal temperatures in each case vary with such parameters as the length and nucleotide composition of the polynucleotide, and the choice of enzymes and other components of the reaction system. Determination of the optimal temperatures and accurate control of the temperatures at the optimal levels are important in achieving success in these procedures. Other protocols and procedures involve multiple reactions performed simultaneously in individual reaction vessels all at the same temperature. Accuracy and control are important in these procedures as well.

Laboratory apparatus in which this kind of control is achieved is offered by numerous suppliers. The typical apparatus includes one or more temperature-controlled blocks, each containing reaction wells in a two-dimensional array, with robotics to move samples between wells in a block or between different blocks and automated processing to control the temperature and drive the robotics. Examples are the RoboCycler 96 of Stratagene, the PTC-100 Thermal Cycler of MJ Research, the Perkin-Elmer DNA Thermal Cycler, and the DNA Engine Thermal Cycler of Micro-PROBE.

Temperature control over the entire array of reaction wells in a two-dimensional array is often less than complete, and edge effects often arise, i.e., temperature differences at the outer wells due to their greater exposure to the atmosphere or to other instrument components. Also, temperature gradients along the well array, which would permit reactions at different temperatures or different protocols to be performed simultaneously, are difficult to achieve.

Also lacking from the units named above and similar units are features that permit the user to visually or optically observe the well contents during the course of the reaction and thereby achieve real-time detection of the progress of the reaction, and to enclose the wells with lids to prevent evaporation of the reaction mixtures without experiencing condensation on the undersides of the lids.

SUMMARY OF THE INVENTION

The present invention resides in part in a temperature block that can establish either a temperature gradient across an array of reaction wells or a uniform temperature throughout the array. The temperature block is useful as a component of a thermal cycler or other similar automated laboratory apparatus which also includes other components and features that participate in sample handling and the performance and control of multiple and/or sequential chemical reactions. One of the features of the block of the present invention is a unique ability to heat and otherwise control the temperature in all wells of the array while eliminating edge effects, i.e., temperature deviations in wells positioned either in the center of the array or along the outer edge of the array due to differences in heat dissipation in these regions.

The present invention also resides in a thermal cycler or similar multiple reaction apparatus that includes a heated transparent lid. The lid performs several functions. One is to apply force to enclosures that are placed over the tops of the wells to secure the contents of the wells from evaporation or other loss. Another is to press the wells down against the heating or cooling block positioned underneath the wells to achieve good thermal contact. This can be done without the use of oil which has been previously used for this purpose. A third function of the heated transparent lid is to permit sufficient light to pass and thereby permit the user to directly detect the progress of the reactions that are taking place in the wells. A fourth function is to prevent condensation of vapors on the undersides of the well enclosures, the condensations otherwise tending to introduce variations in the compositions of the reaction mixtures. The vapors are generated in the wells by the components of the reaction mixtures, particularly when the wells are heated from below.

These features of the heated transparent lid are particularly useful when the thermal cycler or multiple reaction apparatus is used for polymerase chain reactions. The lid is also useful for multiple reaction systems in general, both those in which the reactions are performed simultaneously and those in which they are performed sequentially.

DETAILED DESCRIPTION OF THE INVENTION

While this invention can be implemented in a variety of structures and embodiments, certain specific embodiments are discussed in detail herein to provide an understanding of the invention as a whole.

Figure 1:
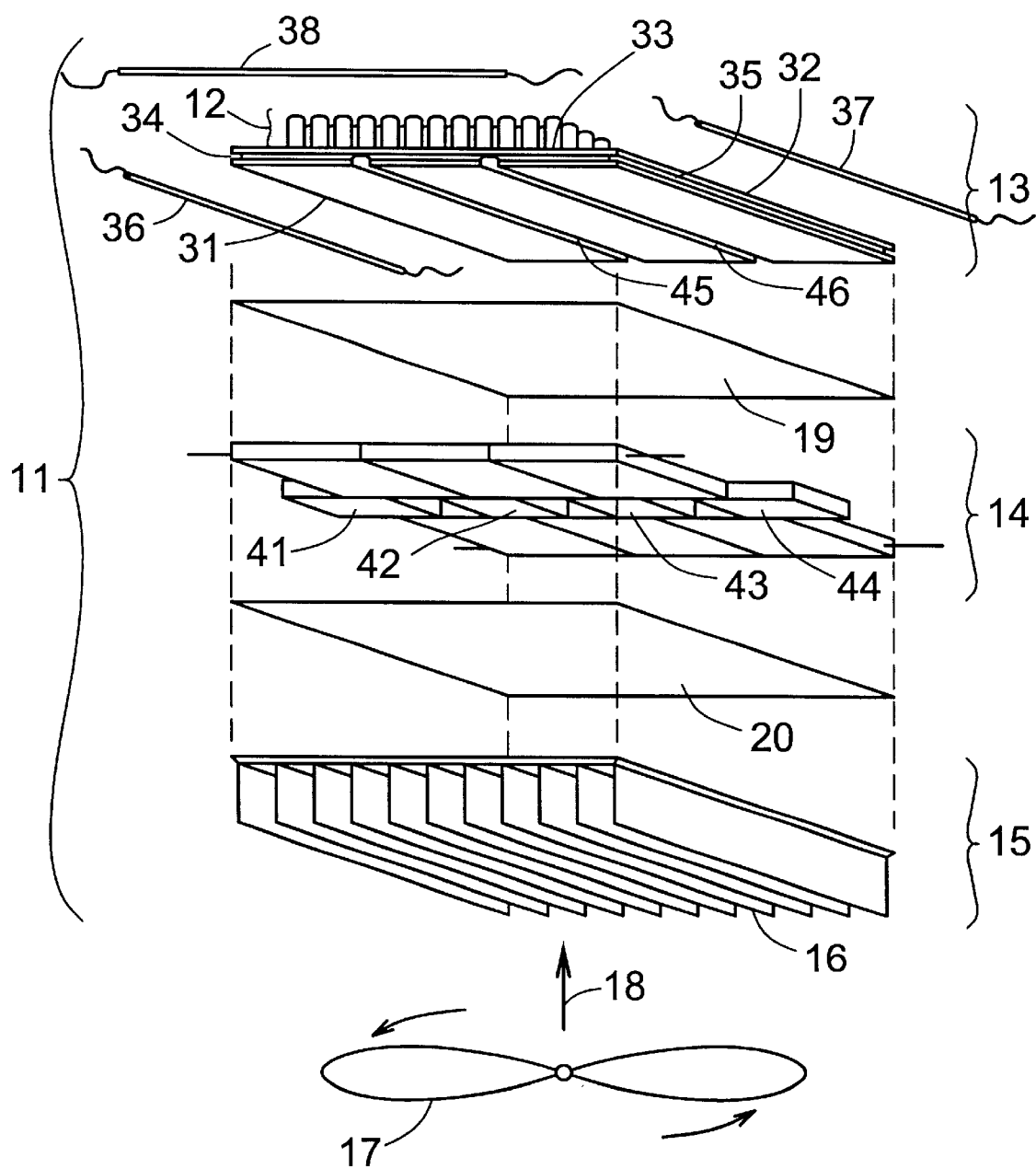
FIG. 1 is an exploded perspective view from below of a temperature block in accordance with the present invention.

In FIG. 1, a temperature block 11 in accordance with this invention is shown. The figure is a perspective view from below with the parts separated vertically, thereby rendering visible the underside of each layer of the block construction together with the front and right side edges of each layer. The reaction wells 12 form a rectangular array on the top surface of the upper layer or sample plate 13. Each well is a hollow cylindrical receptacle open at the top. A common array of wells in thermal cyclers is one containing 96 wells (12×8), although other arrays with more or fewer wells can be used, including single rows of wells. The sample plate is preferably constructed of thin but rigid, thermally conductive material.

The center layer 14 of the block is an array of Peltier modules, which are electrically connected to function as heating and/or cooling elements for the sample plate 13 positioned above. These devices, whose construction and operation are well known among those skilled in the art, utilize the Peltier effect, in which an electric current is passed through the junction of two dissimilar electric conductors to result in the production or absorption of heat depending on the direction of the current through the junction. In Peltier modules, semiconductors such as bismuth telluride appropriately doped to create n-type and p-type materials serve as the dissimilar conductors. The semiconductors are connected through electric leads to a DC power source. Peltier modules are commercially available from many sources, one of which is Melcor Thermal Solutions, Trenton, N.J. USA.

Peltier modules are commonly used in arrays in which they are positioned edge-to-edge to form a planar arrangement for attachment to a flat or smooth surface. In the particular embodiment shown in the Figures, and seen more clearly in the plan view of FIG. 2, six Peltier modules 21, 22, 23, 24, 25, 26 are shown, arranged in two rows of three modules each. The imposition of either a uniform temperature or a temperature gradient is governed by the manner in which current is applied to the Peltier modules and the wire heating elements that are described below. When a temperature gradient is desired, the gradient can be along either of the two axes, i.e., from left to right or from front to rear. The electrical connections between the six modules and the wire heating elements will be selected to achieve a gradient in the desired direction.

Returning to FIG. 1, the lower layer 15 of the block is a heat sink of conventional construction, utilizing an array of fins 16 to dissipate heat generated by the Peltier modules. The removal of heat can also be enhanced by the placement of a fan 17 below the fins, causing air to flow upward into the fins, as indicated by the arrow 18.

Positioned between the Peltier module layer 14 and the sample plate 13 is a solid layer of thermally conductive material 19, and another such layer 20 is positioned between the Peltier module layer and the heat sink 15. These layers serve to improve the dissipation of heat in the lateral directions. Any flat thermally conductive material can be used. An example is GRAFOIL flexible graphite sheets, available from UCAR Carbon Co., Inc., Danbury, Conn., USA. Thermally conductive grease can be used in place of the thermally conductive layers.

Deviations from a uniform temperature or a controlled temperature gradient along the sample plate 13 occur either at the two side edges (left side 31 and right side 32) or at the front edge 33 and the rear edge (not visible), or at all of the edges, since regions along these edges have greater exposure to the atmosphere than regions toward the center of the block. For the left and right side edges 31, 32, grooves 34, 35 are formed along the lengths of each of these two edges, and inserted in these grooves are electrical wire heating elements 36, 37. The two elements are shown removed laterally from the grooves for ease of visibility. In certain embodiments of the invention, additional electrical wire heating elements reside in grooves along the front 33 and rear edges. Only the heating element 38 for the front groove is shown. For these wire heating elements, one example of many suitable elements that can be used is nickel-chromium. The wire can be electrically insulated with conventional insulating material, such as KAPTON tape or tubing (polyimide products available from Phelps Dodge Industries, Trenton, Ga., USA). Heat loss at the left and right edges, or the front and back edges, or all four edges, of the sample plate are thus reduced or eliminated by use of these heating elements. When the heating block is to be maintained at a uniform temperature, the wire heating elements at the left and right edges, or all four wire heating elements, are controlled to compensate for heat loss at the edges. When a temperature gradient is to be imposed across the width of the heating block (from the left edge to the right edge), the two side wire heating elements 36, 37 are set to maintain different temperatures. When a temperature gradient is to be imposed in the direction from the front row of the reaction wells to the back row (or vice versa), the front 38 and rear wire heating elements are set to maintain different temperatures. In either case, the two remaining heating elements can serve to maintain row uniformity, i.e., uniform temperatures within any single row in the direction perpendicular to the gradient.

Figure 2:
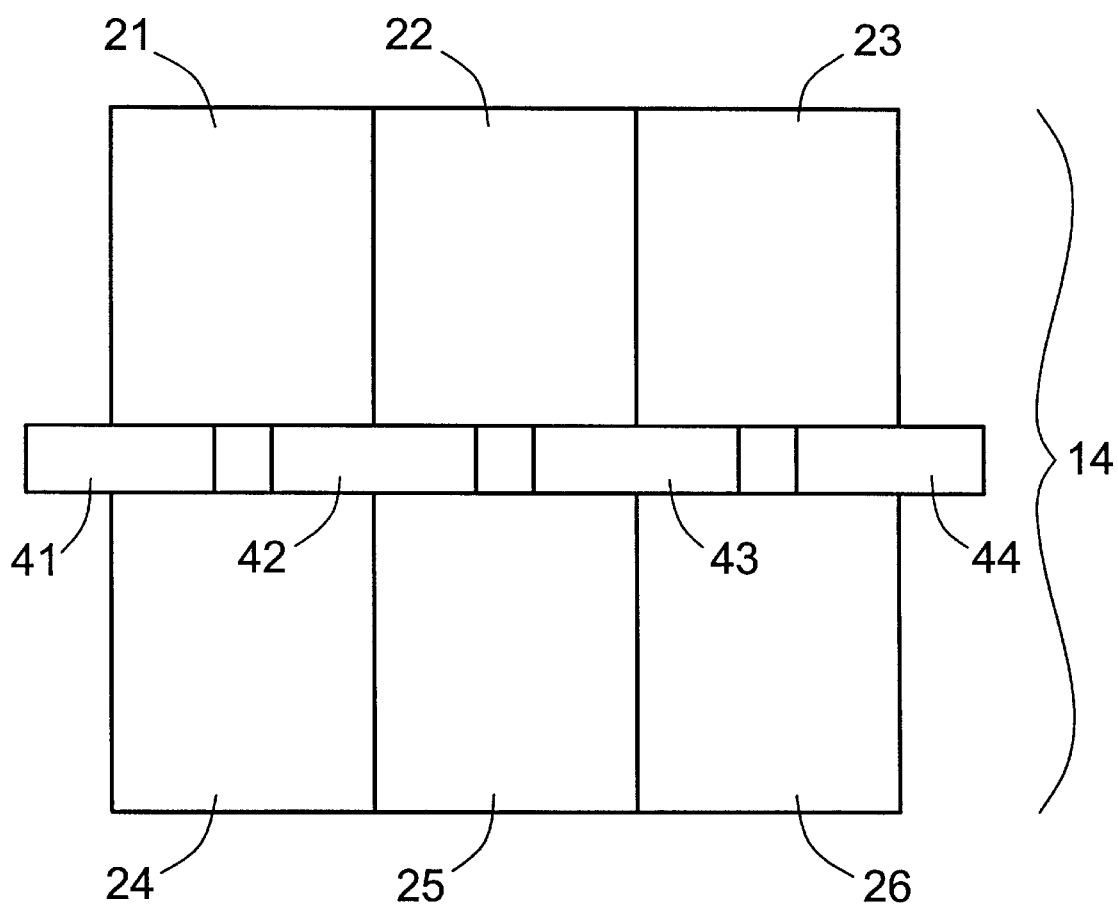
FIG. 2 is a plan view of an array of Peltier modules forming a portion of the block construction of FIG. 1.

The apparatus also contains alternative or additional means for reducing or preventing temperature deviations within rows without using the front and rear heating elements. These means involve the use of blocks or inserts of material with a high coefficient of thermal conductivity, such as aluminum or copper. Four such blocks 41, 42, 43, 44 are shown in FIGS. 1 and 2, positioned in a row between the two rows of Peltier modules. These thermally conductive blocks help dissipate the heat that accumulates at the center of the Peltier array and keep the inner edges of the Peltier modules out of direct contact.

FIG. 1 illustrates an additional feature of this invention that is useful when a temperature gradient is imposed across the block in the left-to-right direction. This feature consists of additional grooves 45, 46 cut into the underside of the sample plate 13, running parallel to the right and left edge grooves 31, 32. These additional grooves 45, 46 are designed to accommodate wire heating elements (not shown) similar to those 36, 37 that are inserted in the edge grooves. These additional heating elements are useful in stabilizing and controlling a temperature gradient in the left-to-right direction, and will be energized at different levels according to the desired gradient. The number of grooves and heating elements is not critical to the invention. Greater or lesser numbers can be used, depending on the accuracy of the gradient that is sought to be achieved. For temperature gradients in the front-to-back direction, grooves can be used that are similar to those shown by running parallel to the front and back edge grooves.

Figure 3:
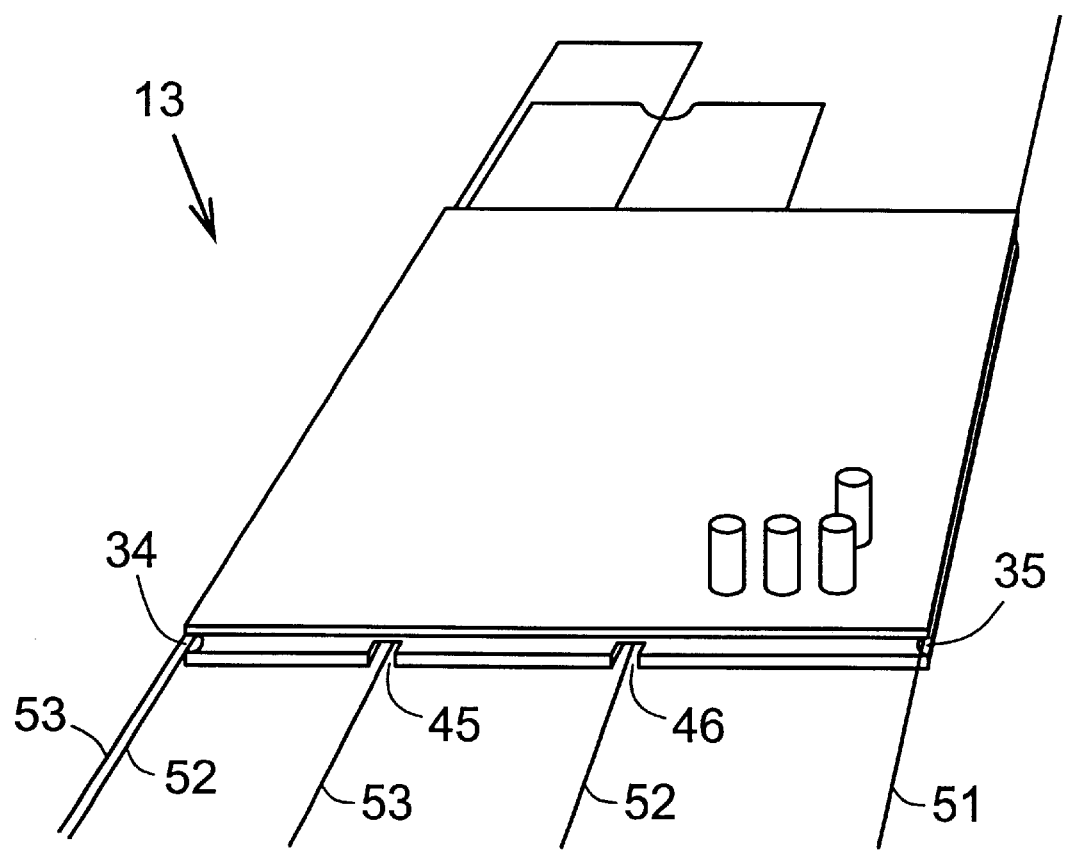
FIG. 3 is a perspective view from above of a portion of second temperature block in accordance with this invention, designed specifically for establishing and maintaining a temperature gradient.

FIG. 3 illustrates an alternative means of establishing a gradient in the left-to-right direction by use of wire heating elements in the same four grooves as those shown in FIG. 1. This view is a perspective view of the sample plate 13 from above rather than below. The rightmost heating element 51 carries the lowest current and thereby heats to the lowest temperature. The second heating element 52 (occupying the second groove 46 in the right-to-left direction) carries an intermediate current to apply sufficient heat to establish a higher temperature than the first heating element 51. The third heating element 53 (occupying the third groove 45) carries a second intermediate current that is greater than that of the first intermediate current of the second heating element 52, thereby applying heat sufficient to establish a temperature that is higher than both the first and second heating elements. Both the second and third heating elements are combined in the groove 34 along the left side edge to supply heat which is the additive combination of the heat supplied to the two intermediate grooves. The temperature along the sample plate will thus vary from the lowest value at the right edge to the highest value at the left edge. A corresponding arrangement can be made for gradients that are front-to-back rather than left-to-right.

An alternative means of establishing a gradient in the front-to-back direction is by delivering power to the Peltier modules 21, 22, 23 in series as one circuit and to the Peltier modules 24, 25, 26 in series as another circuit. The two groups of Peltier modules are then controlled with sensors set at different temperatures. Uniformity of temperatures within each row can be maintained by the left heating element 36 and the right heating element 37.

Control of the temperature, whether it be uniform or a gradient, can be achieved by electronic means in the same manner as that of thermal cyclers of the prior art, typically by the use of a microprocessor. Also as in the prior art, samples can be injected into the wells (or to sample holders inside the wells) and transferred from one well to another by robotics driven by stepper motors or other appropriate mechanisms. The robotics can likewise be controlled by a microprocessor. Further control of the temperature in the block as well as the temperature distribution can be achieved by the inclusion of temperature sensors embedded in the sample plate at various locations. Sensors of conventional construction and design can be used.

Figure 4:
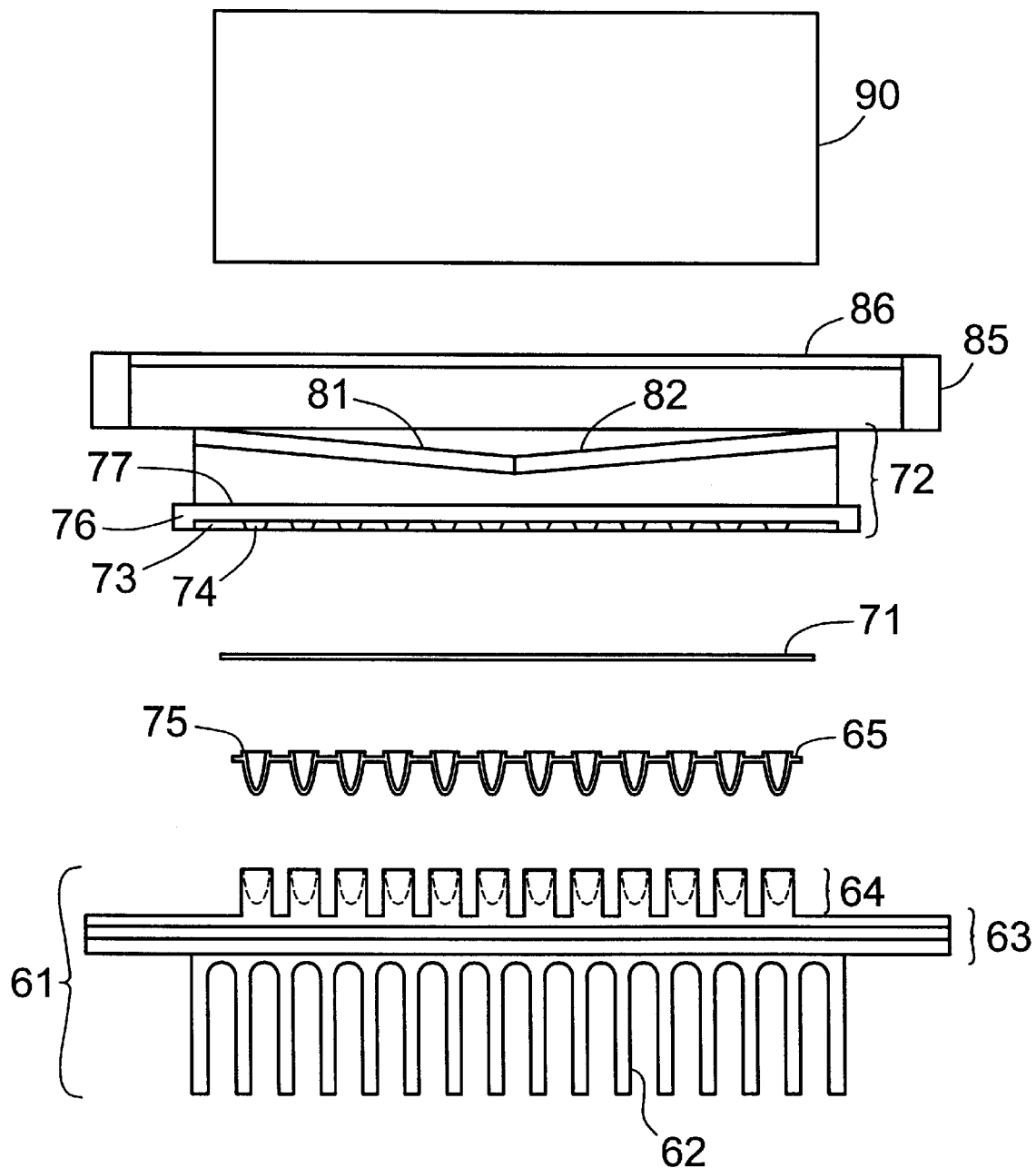
FIG. 4 is an exploded vertical cross section of a thermal cycler incorporating a heated transparent lid in accordance with this invention.

FIG. 4 illustrates additional aspects and features of the invention. The apparatus shown in this Figure is an assembly similar to that of FIG. 1 except in a vertical cross section, although still exploded, and containing certain additional components above the reaction wells. In this case, the lowest component in the assembly is a temperature block 61 that is temperature-controlled or temperature-programmed with heating elements and microprocessors in the same manner as described above, with an array of fins 62 along the underside for heat dissipation. Peltier modules, other heating elements, and circuitry occupy intermediate layers 63, while the upper surface of the block contains an array of cylindrical wells 64 of heat-transmissive material. The component positioned above the temperature block is a tray of open-top reaction vessels 65. The outer contours of the open-top reaction vessels 65 conform in shape to the inner profiles of the cylindrical wells 64 such that the tray can be placed over the temperature block with the reaction vessels resting inside the wells of the block in a close fit with full contact for thermal communication between the temperature block and the interiors of the reaction vessels. The contours are conical to provide access to all liquids in each reaction vessel for purposes of achieving efficient transfer of liquids and washing. Alternatively, the tray can be replaced by individual receptacles or by well strips each containing a row of receptacles. In either case, the cylindrical wells stabilize the reaction vessels by holding them in a fixed position, while also serving as a heat transfer medium to control the temperature of the reaction vessels by either transferring heat to them or removing heat from them. Although only one row of reaction vessels is visible in the drawing, the rectangular array may be 8×12 sample tubes (96 tubes total), 6×10 (60 total), 16×24 (384 total), or any other number and arrangement that would be compatible with an automated system for sample manipulation and detection.

Positioned above the reaction vessel tray is a sealing sheet 71 of transparent material for enclosing the tops of the reaction vessels. Positioned above the sealing sheet is a pressure plate assembly 72 which forces the sealing sheet down over the reaction vessels. The pressure plate assembly 72 contains an apertured plate 73 at its lower extremity, each aperture 74 aligned with one of the reaction wells, with the circular edge of each aperture directly above the raised rim 75 at the top of each reaction vessel. The sealing sheet 71 may be coated with a transparent adhesive to contact the raised rims 75 of the reaction vessels. The apertured plate 73 thus serves as a means for transmitting downward pressure to the reaction vessels. The apertured plate also serves two additional functions. The first is to distribute the heat generated from above (by the conductive coating on the glass plate directly above it, as described below), thereby helping to make the heat distribution uniform. The second is to serve as an optical mask to block the passage of light from areas surrounding the reaction vessels. In systems that include automated detection methods such as those that measure fluorescent emissions from the sample tubes, the optical mask reduces noise and interference in the detected signals.

Directly above the apertured plate 73 is a transparent glass plate 76 whose upper surface 77 is coated with a thin film of electrically conductive material. The heat that is generated when electric current is passed through this film warms the sealing sheet 71 that seals the open tops of the reaction vessels and prevents condensation of vapors from the reaction mixtures on the sealing sheet. The material used as the coating 77 and the thickness of the coating are selected to make the coating substantially transparent in addition to achieving the desired resistance. The passage of current across the plate and through the coating causes the coating to provide resistance heating, while the transparency of the plate and coating permit direct user observation or other forms of optical detection of the contents of the sample tubes from above the glass plate. Various electrically conductive coating materials suitable for this purpose are known to those skilled in the art, and glass plates coated with such materials are available from commercial glass suppliers. Examples of suitable coating materials are tin oxide and indium/tin oxide. Glass coated with these materials may be obtained from Thin Film Devices Inc., Anaheim, Calif., USA, and Abrisa Industrial Glass, Ventura, Calif., USA. Aside from the considerations mentioned above, the thicknesses of the glass and the coating are not critical to the invention and may vary. In most cases, the glass thickness will range from about 0.06 inch (0.15 cm) to about 0.2 inch (0.51 cm), and the coating thickness will be selected to achieve the desired resistivity. For indium/tin oxide coatings, a typical thickness may range from about 750 to about 1400 Angstroms and a typical resistivity may range from about 10 to about 50 ohms per square. In a presently preferred embodiment, the glass is 0.09 inch (0.23 cm) in thickness and the coating resistivity is 30 ohms per square.

A further component of the pressure plate assembly 72 is a pair of lenses 81, 82 that direct the image or light emerging from the reaction vessels 65 and passing through the sealing sheet 71, the apertured plate 73, and the flat glass plate 76 with its conductive coating 77. In this embodiment of the invention, the lenses are angled to avoid reflection or glare.

Figure 5:
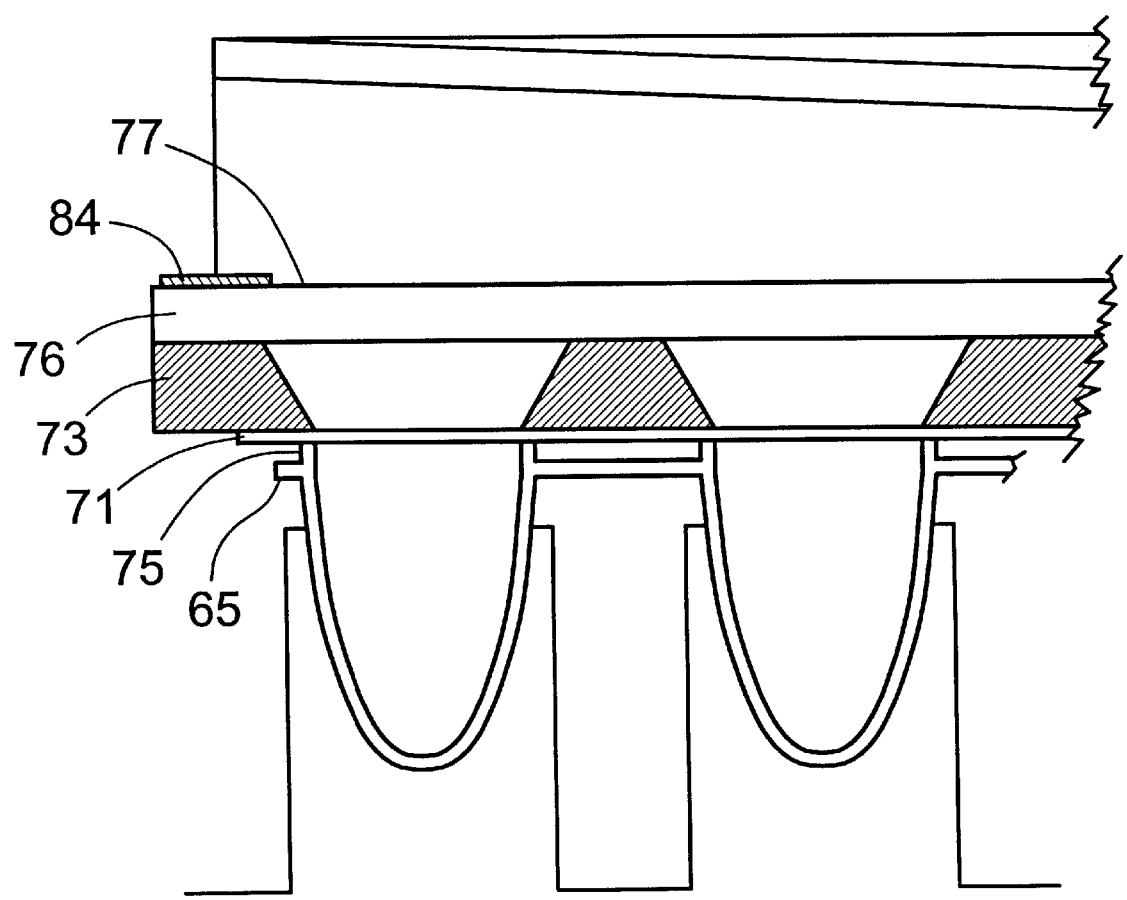
FIG. 5 is an enlarged cross section of one end of the internal components of the thermal cycler of FIG. 4.
Figure 6:
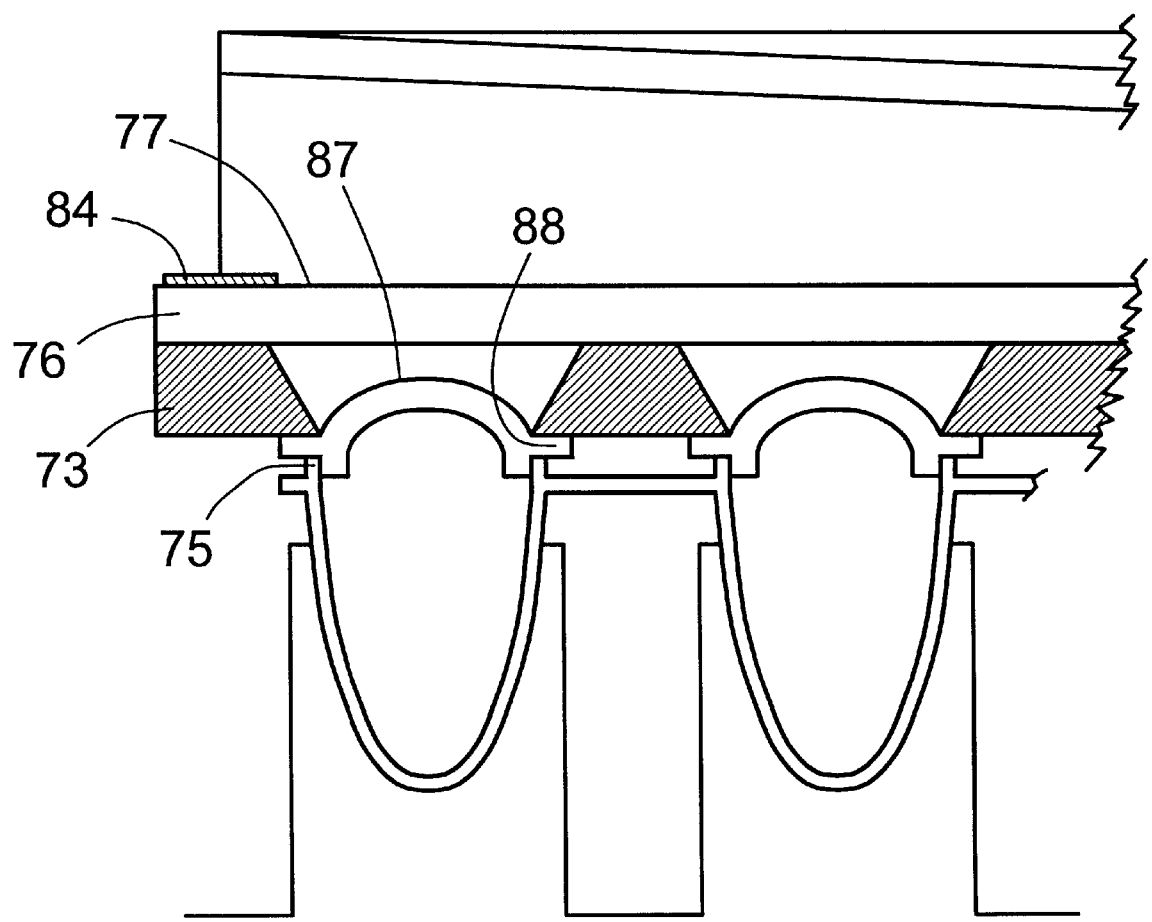
FIG. 6 is an enlarged cross section of an alternative design for a portion of the structure shown in FIG. 5.

The manner in which the temperature block, reaction vessel tray, sealing sheet, and the pressure plate assembly are combined is shown in the enlarged view of FIG. 5. In this Figure, the sealing sheet 71 is a flat sheet covering the entire reaction vessel tray 65. An alternative configuration is shown in FIG. 6, in which individual domed caps 87 with peripheral flanges 88 are used. In either case, the apertured plate is chamfered around each aperture to increase the visibility of the interiors of the reaction vessels while still pressing the sealing sheet 71 or the flanges 88 against the raised rims 75 of the reaction vessel.

The glass plate 76 whose upper surface is coated with a resistance heating film 77 rests above the apertured plate, and electric current is supplied to the film by contact strips 84 (only one is shown; a second strip is positioned along the opposite edge of the glass plate) that function as electric leads. The strips are conveniently bonded to the coated glass along opposite edges with electrically conductive adhesive such as silver-filled epoxy (Epoxies Etc., Greenville, R.I., USA). Alternatively, conductive metal bus bars can be applied as coatings on the conducting glass. The strips or bus bars are connected to appropriate circuitry and a power source such that power can be supplied or removed at will and controlled at variable levels.

Returning to FIG. 4, the pressure plate assembly 72 is mounted in a frame 85 that holds the plate components together. Included on the frame is a protective transparent window 86. The window prevents air movement above underlying components and prevents the escape of heated air, thereby contributing to the temperature control of the system. The frame also contains internal springs (not shown) which permit the frame to apply pressure to seal the reaction vessels. Positioned above the frame are conventional optical components 90 for monitoring the progress of the reactions in each reaction vessel.

The frame 85 is equipped for movement in the vertical direction to raise and lower the pressure plate assembly as needed, and to contact the pressure plate assembly with the temperature block 61 to form an enclosure to prevent exposure to external air disturbances.

All materials and electrical components used in this apparatus are readily available from commercial suppliers.

We claim:

1. A temperature control block to support a plurality of reaction vessels in a rectangular arrangement while controlling the temperature of each vessel, said block comprising:

a plurality of wells arranged in a rectangular array on one side of said block, each well sized to receive one such reaction vessel;

at least one Peltier effect thermoelectric module affixed to said block on a side opposite that of said wells;

a first wire heating element affixed to said block along one edge of said rectangular array; and a second wire heating element affixed to said block along a second edge of said rectangular array opposite said first edge.

2. A temperature control block in accordance with claim 1 in which said first and second wire heating elements are independently controllable such that said elements can be set to different temperatures, thereby forming, in conjunction with said at least one Peltier effect thermoelectric module, a temperature gradient across said rectangular array of wells, or to the same temperature, thereby forming, in conjunction with said at least one Peltier effect thermoelectric module, a uniform temperature throughout said rectangular array of wells.

3. A temperature control block in accordance with claim 1 comprising at least two Peltier effect thermoelectric modules independently controllable to be set at different temperatures, thereby forming, in conjunction with said first and second wire heating elements, a temperature gradient across said rectangular array of wells.

4. A temperature control block in accordance with claim 1 in which said wells have tapering profiles to conform to reaction vessels with tapering exteriors.

5. A temperature control block in accordance with claim 1 further comprising cooling fins affixed to said block to dissipate heat released by said at least one Peltier effect thermoelectric module.

6. A temperature control block in accordance with claim 1 further comprising third and fourth wire heating elements affixed to said block along edges orthogonal to those to which said first and second wire heating elements are affixed.

7. Apparatus for conducting a plurality of chemical reactions simultaneously in individual enclosed reaction vessels while monitoring the reaction in each vessel, said apparatus comprising:

a plurality of open-top reaction vessels;

a support block in which are formed a plurality of wells shaped to receive said open-top reaction vessels;

transparent lid means for enclosing the open tops of each of said reaction vessels;

a transparent plate arranged to press said transparent lid means against said open tops of said reaction vessels, said transparent plate coated with a transparent resistance heating film; and means for supplying electric current to said resistance heating film.

8. Apparatus in accordance with claim 7 further comprising an apertured plate positioned between said transparent lid means and said transparent plate to transmit pressure from said transparent plate to said transparent lid means, the apertures of said apertured plate aligned with the wells of said support block.

9. Apparatus in accordance with claim 7 in which said transparent plate is glass and said transparent resistance heating film is a member selected from the group consisting of tin oxide and a mixture of indium and tin oxide.

10. Apparatus for conducting a plurality of chemical reactions simultaneously in individual enclosed reaction vessels at a controlled temperature in each vessel while monitoring the reaction in each vessel, said apparatus comprising:

a plurality of open-top reaction vessels;

a temperature control block into one surface of which are formed a plurality of wells arranged in a rectangular array, each well sized to receive one such reaction vessel;

at least one Peltier effect thermoelectric module affixed to said block on a side opposite that of said wells;

a first wire heating element affixed to said block along one edge of said rectangular array; and a second wire heating element affixed to said block along a second edge of said rectangular array opposite said first edge transparent lid means for enclosing the open tops of each of said reaction vessels;

a transparent plate arranged to press said transparent lid means against said open tops of said reaction vessels, said transparent plate coated with a transparent resistance heating film; and means for supplying electric current to said resistance heating film.

* * * * *